April 2, 1957 T. W. KALBOW 2,787,700
WORK FEEDING AND POSITIONING MECHANISM
Filed Jan. 12, 1955 3 Sheets-Sheet 1
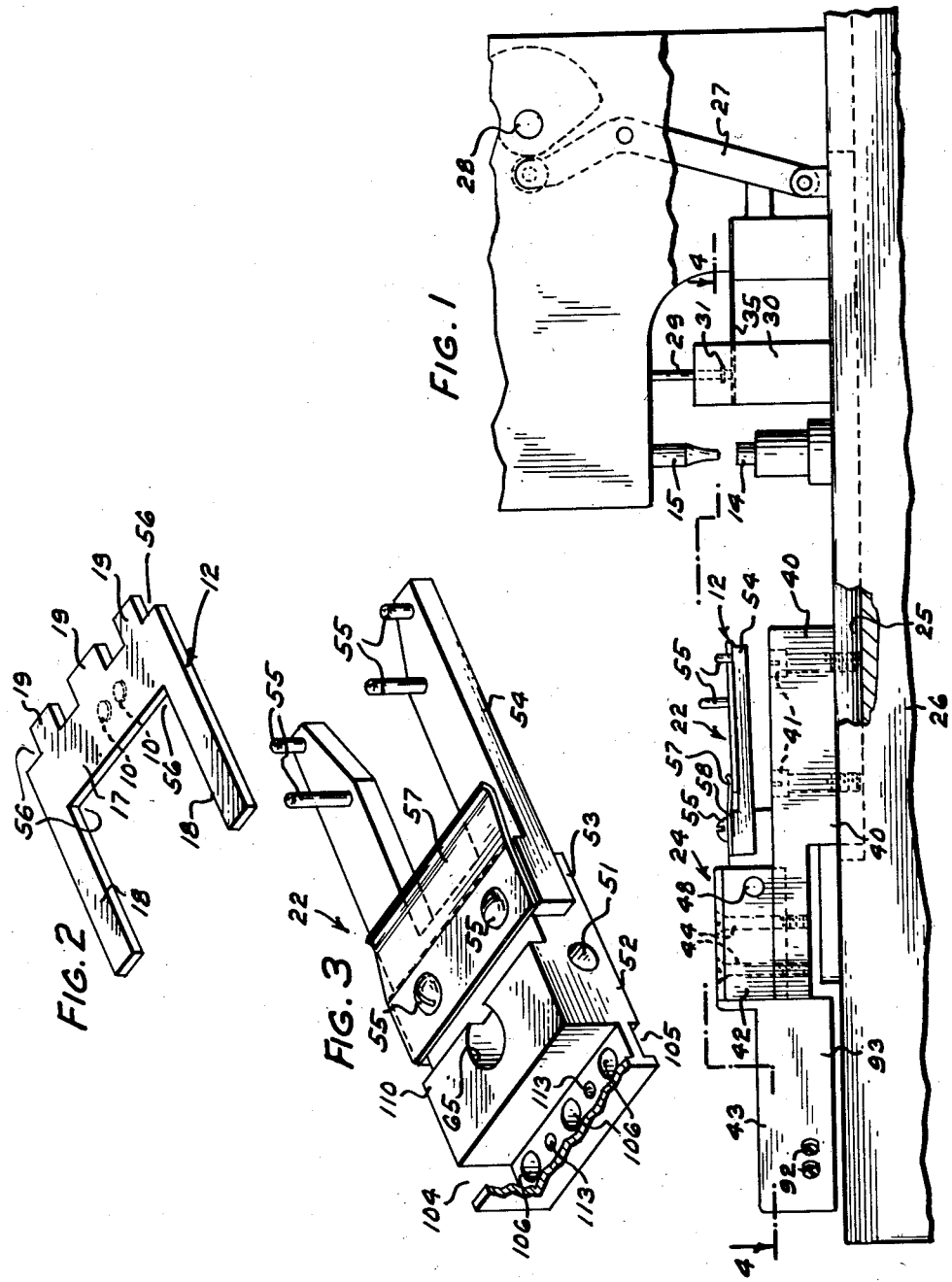
INVENTOR
T. W. KALBOW
BY C. B. Hamilton
ATTORNEY

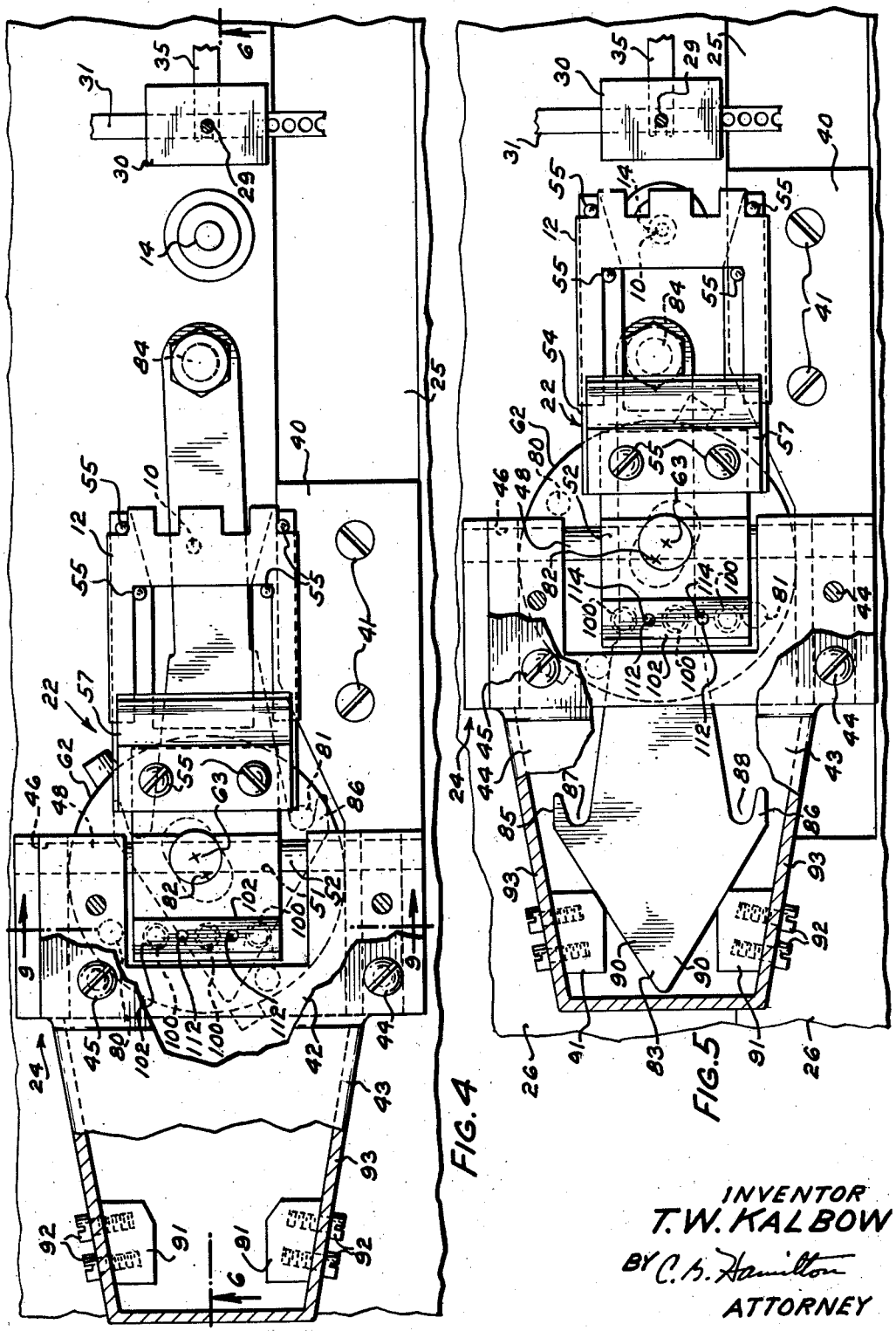
April 2, 1957 T. W. KALBOW 2,787,700
WORK FEEDING AND POSITIONING MECHANISM
Filed Jan. 12, 1955 3 Sheets-Sheet 2
INVENTOR
T. W. KALBOW
BY C. S. Hamilton
ATTORNEY

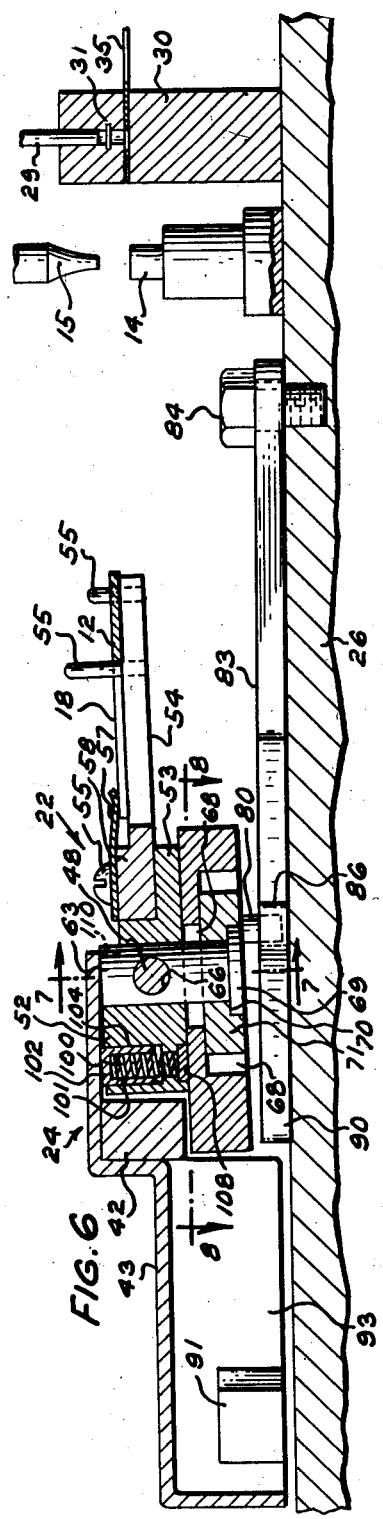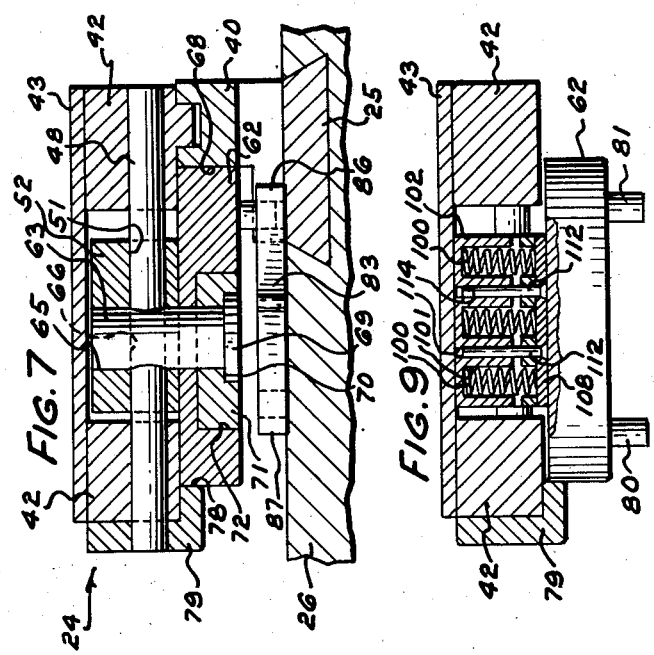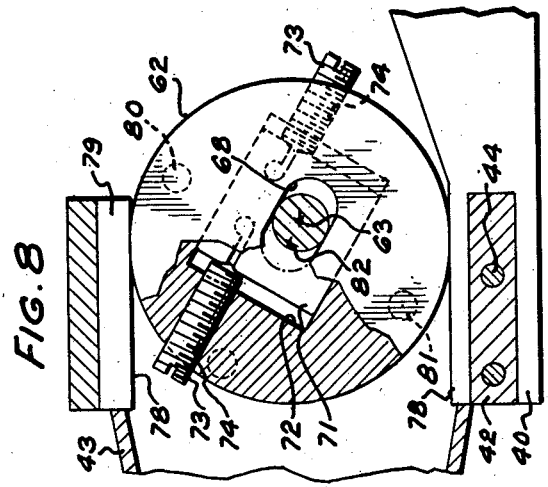

United States Patent Office 2,787,700
Patented Apr. 2, 1957

2,787,700
WORK FEEDING AND POSITIONING MECHANISM

Theodore W. Kalbow, Chicago, Ill., assignor to Western Electric Company, Incorporated, New York, N. Y., a corporation of New York Application January 12, 1955, Serial No. 481,390

9 Claims. (Cl. 219—158)

This invention relates to a welding apparatus for sequentially welding a pair of contacts onto a part and more particularly to a mechanism for feeding and accurately positioning the part successively in different locations between the welding electrodes of the apparatus while the contacts are being welded thereto.

An object of the invention is to provide an adjustable mechanism for feeding a part successively to selectively variable positions relative to a work station of an apparatus.

Another object of the invention is to provide a reciprocable article feeding device for feeding a part in one direction to a work station and for laterally shifting the position of the part in opposite directions through selected distances on successive reciprocations.

A further object of the invention is to provide a welding apparatus for feeding and welding a pair of contacts onto a part and a reciprocable feed mechanism for moving the part to and from a welding station and for shifting the part laterally on successive reciprocations to accurately hold the part in different positions at said station as the contacts are sequentially welded to the part in predetermined spaced relation to each other.

A device illustrating certain features of the invention for feeding a part to two operative positions relative to a pair of welding electrodes of a welding apparatus may include a carriage reciprocable toward and away from the welding electrodes and having a work holder for carrying a part to and accurately positioning it between the electrodes for welding of a pair of contacts thereon. The work holder is mounted on the carriage for transverse movement thereof and is connected to an adjustable crank pin on an indexible member which is oscillatably mounted on the carriage and has a pair of diametrically opposed projecting pins. On successive return movements of the carriage the pins are alternately actuated by an actuating pawl mounted for pivotal movement about a fixed axis on the welding apparatus for oscillating the indexible member and shifting the work holder on the carriage in opposite directions in response to successive reciprocations of the carriage. The crank pin may be adjusted to vary the length of transverse movement of the work holder on the carriage whereby the work holder accurately locates the part successively in two positions while the two contacts are sequentially welded thereto in a predetermined spaced relation to each other.

Other objects and advantages of the invention will become apparent by reference to the following detailed description and the accompanying drawings illustrating a preferred embodiment thereof, in which:

Fig. 1 is a fragmentary side elevational view of the apparatus for welding contacts onto the armature;

Fig. 2 is a perspective view of the armature with a pair of contacts welded to the underside thereof;

Fig. 3 is a perspective view of the armature holder of the apparatus;

Fig. 4 is a fragmentary enlarged plan view partly in section taken on line 4—4 of Fig. 1 and showing the parts in one position;

Fig. 5 is a fragmentary plan view similar to Fig. 4 showing some of the parts in a second position;

Fig. 6 is a longitudinal vertical sectional view through a portion of the article feeding and positioning mechanism taken on line 6—6 of Fig. 4;

Fig. 7 is a fragmentary vertical cross-sectional view through the article positioning mechanism taken on line 7—7 of Fig. 6;

Fig. 8 is a fragmentary plan sectional view of a portion of the article positioning mechanism taken on line 8—8 of Fig. 6; and Fig. 9 is a vertical sectional view of the device taken on line 9—9 of Fig. 4.

The present apparatus is designed to weld a pair of contacts 10 (Fig. 2) onto a part 12 in the form of a U-shaped relay armature. The part 12 is advanced into a first predetermined welding position between a pair of electrodes 14 and 15 and one contact is welded thereon, after which the part is withdrawn, moved laterally a predetermined distance and again advanced into a second predetermined welding position and the second contact is welded thereon in a predetermined spaced relation to the first. The contacts 10 which are in the form of discs of precious metal are welded to the underside of the head 17 of the armature part 12 which has a pair of legs 18 extending therefrom in one direction and a plurality of lugs 19 extending therefrom in the opposite direction. The part 12 is adapted to be supported in a work holder 22 (Fig. 3) which is mounted on a carriage 24 (Figs. 1, 4, 5, and 6) and the carriage is secured to a slide 25 reciprocably mounted on a base 26 of the apparatus for advancing the part 12 from a retracted or loading position (Figs. 1 and 4) to an advanced or welding position between the electrodes 14 and 15 (Fig. 5) where the contacts 10 are sequentially welded thereto.

The slide 25 is pivotally connected to an actuating lever 27 (Fig. 1) which cooperates with a cam on a cam shaft 28 of the apparatus to reciprocate the carriage 24, the work holder 22, and the part 12 carried thereby to and from a welding station between the electrodes 14, 15 of the apparatus.

The contacts 10 are formed by a punch 29 and a die 30 from a strip 31 of contact material which is fed step by step through a slot in the die by feed mechanism (not shown) actuated by the slide 25. The punch 29, which is operatively connected to the cam shaft 28 through a suitable lever and cam (not shown) and actuated thereby punches a contact 10 from the strip 31 and pushes it downwardly into the slotted end of a flat spring transfer finger 35 which yieldably retains the contact therein. The transfer finger is operatively connected through a lever and a cam (not shown) to the cam shaft 28 and is reciprocated thereby to feed the contact into the welding station above the lower stationary welding electrode 14 while the part 12 is also moved to the welding station above the contact and between the welding electrodes 14 and 15. The upper electrode 15 is actuated by the cam shaft 28 through a cam and lever (not shown) to press the part 12 onto the contact 10 which engages the lower electrode, and a welding current is passed therethrough to weld the contact onto the part. The apparatus is manually controlled by a foot treadle (not shown) which may be actuated once to effect one reciprocation of the carriage 24 and a part 10 carried thereby to and from the welding station and the welding of one contact 10 onto the part, or the foot treadle may be held down for two reciprocations of the carriage and the welding of two contacts onto the part.

The carriage 24 comprises a member 40 (Figs. 1, 4, 5, and 7) which is secured to the slide 25 with screws 41 and has a U-shaped block 42 and a sheet metal housing 43 secured thereto along one edge by screws 44. The block 42 and the housing 43 extend laterally from the member 40 and are secured together along the opposite edge thereof by screws 45. The arms of the U-shaped block 42 have apertures 46 in which are secured the ends of a rod 48, the intermediate portion of which is disposed in an aperture 51 (Fig. 3) of a member 52 which forms one component of the work holder 22. The work holder 22 is supported on the rod 48 for movement axially of the rod and transversely of the direction of reciprocation of the carrier 24, and for slight vertical rocking movement about the axis of the rod. The member 52 has a reduced end portion 53 to which another component in the form of a U-shaped plate 54 is removably secured by screws 55. The plate 54 has a pair of positioning pins 55 on the forward end of each of the legs thereof for engaging the recesses or corners 56 of the part 12 to position the part thereon in a predetermined location. The ends of the legs 18 of the part 12 are inserted under a flat spring 57 which is secured to the raised end portion 58 of the plate 54 by the screws 55. The part 12 is readily applied and removed from the holder 22 and is yieldably retained in position thereon by the flat spring 57.

The U-shaped component 54 of the work holder 22 may be removed from the component 52 and replaced by other components 54 of different sizes to accommodate parts 12 of various sizes and on which the contacts 10 are welded in various spaced relations to each other.

Adjustable mechanism is provided for shifting the work holder 22 axially on the rod 48 and laterally of the carriage 24 through various predetermined distances to move the work holder and the part 12 carried thereby relative to the electrodes 14 and 15 between a pair of predetermined positions in order to insure the welding of the contacts 10 in predetermined positions on the part 12 and in a predetermined spaced relation to each other. The shifting mechanism operates to move the holder 22 on the rod 48 alternately in opposite directions in response to successive reciprocations of the carrier 24 and includes a circular indexible element 62 in the form of a disc on which a crank pin 63 is adjustably mounted. The upper end of the crank pin fits in an aperture 65 in the member 52 of the work holder 22 and has a transverse aperture 66 therein (Figs. 6 and 7) for receiving the rod 48 on which the crank pin 63 is supported for sliding movement with the work holder. The crank pin 63 passes through a diametrically disposed slot 68 in the disc 62 and the lower end of the pin has an enlarged head 69 and is journalled in a counterbored aperture 70 in a rectangular block 71 for supporting the block for oscillating movement thereon. The block 71 which is slidably mounted in a rectangular recess 72 in the underside of the disc 62 and serves to support the disc is capable of being adjusted longitudinally in the slot 68 by a pair of adjusting screws 73 (Fig. 8) mounted in threaded apertures 74 in the disc. The cylindrical outer surface of the disc 62 is engaged on opposite sides thereof by a pair of straight guide surfaces 78—78 formed on a guide member 79 and the member 40 which are secured to the block 42 of the carriage. The disc 62 is adapted to be oscillated through a predetermined arc of approximately 60° and in response to oscillation thereof the crank pin 63 will reciprocate the work holder 22 through a predetermined distance and between a pair of predetermined positions on the carriage.

Means are provided for oscillating the disc 62 alternately in opposite directions in response to successive reciprocations of the carriage 24 which includes a pair of diametrically opposed downwardly directed pins 80 and 81 on the disc disposed predetermined uniform distances on opposite sides of the center 82 of the disc. In response to successive reciprocations of the disc 62 with the carriage 24, the pins 80 and 81 on the disc are adapted to be alternately engaged by an actuating pawl 83 for oscillating or indexing the disc from one position (Fig. 4) to another (Fig. 5) to effect the lateral shifting of the work holder 22 from one position to another on the carriage 24. The pawl 83 is pivotally mounted at its forward end for oscillating movement about a vertical pin 84 secured to the base 26, and adjacent its rear end the pawl has a pair of laterally disposed hooks 85 and 86 and a pair of recesses 87 and 88 adapted to engage the pins 80 and 81, respectively. The rear end of the pawl is pointed and has a pair of diverging sides 90 which are adapted to engage a pair of centering members 91 adjustably secured by screws 92 to the converging side walls 93 of the housing 43. The pivot 84 of the pawl 83 is disposed in a vertical plane passing through the center 81 of the disc 62 and parallel to the guide surfaces 78, 78 and the direction of reciprocation of the carriage 24. In response to the movement of the carriage 24 to its forward position for advancing the part 12 to the welding station, one of the pins 80, 81 which was last engaged by the pawl 83 moves away from the hook 85 or 86 associated therewith, and the centering members 91 on the carriage engage the diverging sides 90 of the pawl and swing the pawl from its angular position into an intermediate or centered position in alignment with a centerline passing through the pivot 84 and the center 81 of the disc 62 as shown in Fig. 5.

After a contact 10 has been welded on the part 12, the carriage 24 is returned to its loading position shown in Fig. 4 and during the return movement of the carriage, the other one of pins 81, 80 on the disc 62 will be carried into engagement with one of the hooks 86, 85 on the pawl 83 and will be held thereby against longitudinal movement as the carriage and the disc 62 continue their movement rearwardly to the end of the stroke and cause the disc 62 to be indexed and rotated about its center 81 through approximately 60° to the position shown in Fig. 4, and cause the crank pin 63 to shift the work holder 22 on the rod 48 from one lateral position to the other.

When the carriage 24 is in its retracted or loading position as shown in Fig. 4 and the holder 22 is in its first lateral position thereon as shown in Fig. 5, the disc 62 and pins 80 and 81 thereon are in the position shown in Figs. 5 and 8 so that a part 12 may be placed on the holder and the apparatus actuated to advance the part 12 to a first predetermined welding position (Fig. 5) and the first contact 10 welded thereto in a predetermined position to the underside thereof. The pawl 83 is also centered by the members 91 on the forward stroke of the carriage 24. On the return stroke of the carriage from the first welding position shown in Fig. 5 to the loading position shown in Fig. 4, the hook 86 of the actuating pawl 83 engages the pin 81 on the disc 62 and indexes it to its other position to cause the holder 22 to be shifted on the carriage to its second lateral position as shown in Fig. 4. On the following advance movement of the carriage to the welding station, the part 12 is disposed between the electrodes in its second predetermined welding position and the second contact 10 is welded in a predetermined position to the underside of the part in a predetermined spaced relation to the first contact 10 thereon. During the return stroke of the carriage after the second contact has been welded onto the part 12, the hook 85 of the actuating pawl 83 will engage the pin 80 and index the disc 62 and cause the holder 22 to be shifted to its first lateral position on the carriage 24.

The extent of lateral shifting movement of the work holder may be varied within predetermined limits to attain various precise spacings of the contacts 10 on armature parts 12 of different sizes by turning the adjusting screws 73 to vary the distance between the crank pins 63 and the center 81 of the disc 62.

The work holder 22 is supported on the rod 48 for slight rocking movement thereon and the holder is yieldably maintained in a slightly upwardly tilted position to support the part 12 thereon at an elevated position while it is fed between the electrodes 14 and 15 and above the contact 10 and to permit the part 12 to be moved downwardly into engagement with the contact by the movable electrode 15 and welded thereto. Resilient means are provided for yieldably maintaining said work holder in its upper tilted position which includes a plurality of helical springs 100 (Figs. 6 and 9), the upper ends of which fit in recesses 101 in a spring retainer 102. The retainer 102 of rectangular outline fits into a rectangular slot 104 in the member 52 (Fig. 3) of the work holder which also has a lower rectangular slot 105 and a plurality of apertures 106 aligned with the apertures 101 of the spring retainer to provide clearance for the springs 100. The springs 100 engage a rectangular block 108 of friction material which is positioned in the slot 105 and engages the upper surface of the indexing disc 62, and the springs 100 stress the spring retainer 102 and the block 108 in opposite directions against the upper wall of the housing 43 and upper surface of the disc 62 to rock the work holder 22 and the disc 62 in a counter-clockwise direction about the rod 48 as viewed in Fig. 6 to its upwardly tilted position. The upper edge portion 110 (Fig. 3) of the block 52 engages the lower surface of the housing 43 and serves to stop the work holder in its upper tilted position. The pressure of the friction block 108 against the upper surface of the cam disc 62 serves to yieldably retain the disc 62 in its set angular position and prevent accidental displacement thereof. A pair of pins 112 secured to the friction block 108 extend upwardly therefrom through apertures 113 in the member 52 and apertures 114 in the spring retainer 102 and serve to prevent lateral movement of the friction block and the spring retainer relative to the member 52.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for feeding a part into different operative positions at a work station of an apparatus comprising a base, a carriage on said base, means for moving said carriage to and from said work station, a work holder for supporting said part, means mounting said work holder on said carriage for movement therewith and for lateral movement relative thereto, and means for shifting said work holder laterally on said carriage alternately in different directions in response to successive movements of said carriage to locate the part sequentially in said operative positions.

2. A work feeding and positioning device comprising a holder for supporting a part, a longitudinally reciprocable carriage, means mounting said holder on said carriage for longitudinal movement therewith and for lateral movement thereon, means for reciprocating said carriage to and from a retracted position and an advanced position, and means for laterally shifting said work holder and the part carried thereby alternately in opposite directions on said carrier from one position to another in response to successive movements of said carrier from said advanced position to said retracted position.

3. A feeding and positioning device comprising a holder for supporting a part, a carriage mounted for reciprocation in one direction, means mounting said holder on said carriage for movement therewith and for movement relative thereto transversely of said one direction, means for reciprocating said carriage to move the holder and a part therein to and from a work station, and adjustable means for transversely shifting said work holder alternately in opposite directions on said carrier through various distances in response to successive reciprocations of said carrier to successively locate a part on said holder in two operative positions at said work station.

4. A device for sequentially feeding a part into two operative positions in a work station of an apparatus comprising a base, a carriage, means for longitudinally reciprocating said carriage on said base to and from said work station, a work holder for supporting a part, means mounting said work holder on said carriage for longitudinal movement therewith and for lateral movement relative thereto, an indexible member oscillatably mounted on said carriage, means for oscillating said member alternately in opposite directions through a predetermined angular distance in response to successive reciprocations of said carriage, an eccentric connector element adjustably mounted on said indexible member and connected to said work holder for shifting said work holder laterally on said carriage alternately in opposite directions in response to oscillation of said indexible member to position the part sequentially in said two operative positions, and means for adjusting the position of the eccentric element on said indexible member to vary the extent of lateral movement of said work holder and the part thereon.

5. A work feeding and positioning device comprising a base, a carriage mounted on said base for longitudinal reciprocation, a work holder mounted on said carriage for longitudinal movement therewith and for lateral movement relative thereto, means for actuating said carriage to advance it to a work station and return it therefrom, an indexible member mounted on said carriage for oscillatable movement about an axis passing through said member, said indexible member having an eccentric connection with said work holder and having a pair of elements projecting therefrom on opposite sides of said axis, an actuating pawl mounted for pivotal movement about a fixed axis on said base and engageable with alternate elements on successive return movements of said carriage for oscillating said indexible member alternately in opposite directions through a predetermined arc, said pawl being swung laterally alternately in opposite directions from an intermediate position by said elements during the oscillation of said indexible member on successive return movements of said carriage, and means on said carriage for swinging said pawl to said intermediate position on the advance movements of said carriage to dispose said pawl for engaging said elements alternately on successive reciprocations.

6. A work feeding and positioning device comprising a base, a carriage mounted on said base for longitudinal reciprocation, a work holder mounted on said carriage for longitudinal movement therewith and for lateral movement relative thereto, means for actuating said carriage to advance it to a work station and return it therefrom, an indexible member mounted on said carriage for oscillatable movement about an axis passing through said member and having a pair of elements projecting therefrom on opposite sides of said axis, an eccentric connector element adjustably mounted on said indexible member and connected to said work holder, means for adjusting the connector element on said member to vary the distance between said element and said center of the member, an actuating pawl mounted for pivotal movement about a fixed axis on said base and engageable with alternate elements on successive return movements of said carriage for oscillating said indexible member alternately in opposite directions through a predetermined arc to shift the work holder and a part therein laterally on the carriage from one position to another, said pawl being swung laterally alternately in opposite directions from a center position by said elements during successive return movements of said carriage, and means on said carriage for swinging said pawl to said center position on the advance movements of said carriage to dispose said pawl for engaging said elements alternately on successive reciprocations.

7. A work feeding and positioning device comprising a base, a carriage mounted on said base for longitudinal reciprocation, a work holder, means mounting said work holder on said carriage for longitudinal movement therewith and for lateral movement relative thereto and for oscillatable movement about a horizontal axis, means for actuating said carriage to advance the work holder and a part therein to a work position and return them to a loading position, resilient means for oscillating said work holder to and yieldably holding it in a predetermined upper position whereby a part is advanced into said work position at a predetermined elevation and is depressed onto another part at said work position, an indexible member mounted on said carriage for oscillatable movement about a vertical axis passing through said member and having an eccentric connection with said work holder, a pair of elements projecting from said member on opposite sides of said axis, an actuating pawl mounted for pivotal movement about a fixed axis on said base and engageable with alternate pins on successive return movements of said carriage for oscillating said indexible member alternately in opposite directions through a predetermined arc to shift the work holder and part therein laterally on the carriage from one position to another, said pawl being swung laterally alternately in opposite directions from a center position by said pins during successive return movements of said carriage, and means on said carriage for swinging said pawl to said center position on the advance movements of said carriage to dispose said pawl for engaging said elements alternately on successive reciprocations.

8. In a welding apparatus for sequentially welding a pair of contacts onto a part, the combination of a base, a stationary electrode on said base, a movable electrode, means for feeding contacts successively onto said stationary electrode, a carriage mounted on said base for longitudinal reciprocation, a work holder for supporting a part, means mounting said work holder on said carriage for movement therewith and for lateral movement relative thereto and for rocking movement about a horizontal axis, means for actuating said carriage to advance the work holder and the part thereon to a welding position between the electrodes and return them to a loading position, resilient means for rocking said work holder to and yieldably holding it in a predetermined upper position whereby a part is advanced with the work holder into said welding position at an elevation above a contact on the stationary electrode and is movable downwardly into engagement therewith, an indexible member mounted on said carriage for oscillatable movement about an axis passing through said member, said indexible member having a pair of pins projecting therefrom on opposite sides of said axis and having an eccentric connection with said work holder, an actuating pawl mounted for pivotal movement about a fixed axis on said base and engageable with alternate pins on successive movements of said carriage in one direction for oscillating said indexible member alternately in opposite directions through a predetermined arc to shift the work holder and a part therein laterally on the carriage from one position to another, said pawl being swung laterally alternately in opposite directions from a center position by said pins during successive movements of said carriage in said one direction, and centering means on said carriage for swinging said pawl to said center position on the movements of said carriage in the reverse direction to dispose said pawl for engaging said pins alternately on successive reciprocations.

9. In an article feeding device, a carriage, means for reciprocating said carriage to and from a work station, an article holder mounted on said carriage for reciprocable movement therewith and for transverse movement thereon between two positions, and means for shifting the holder on the carriage from one position to the other in response to successive reciprocations of the carriage to sequentially locate the article in two predetermined positions at the work station.

References Cited in the file of this patent
UNITED STATES PATENTS
2,668,219   Sandberg et al. _____ Feb. 2, 1954